United States Patent Office 3,115,579
Patented Dec. 24, 1963

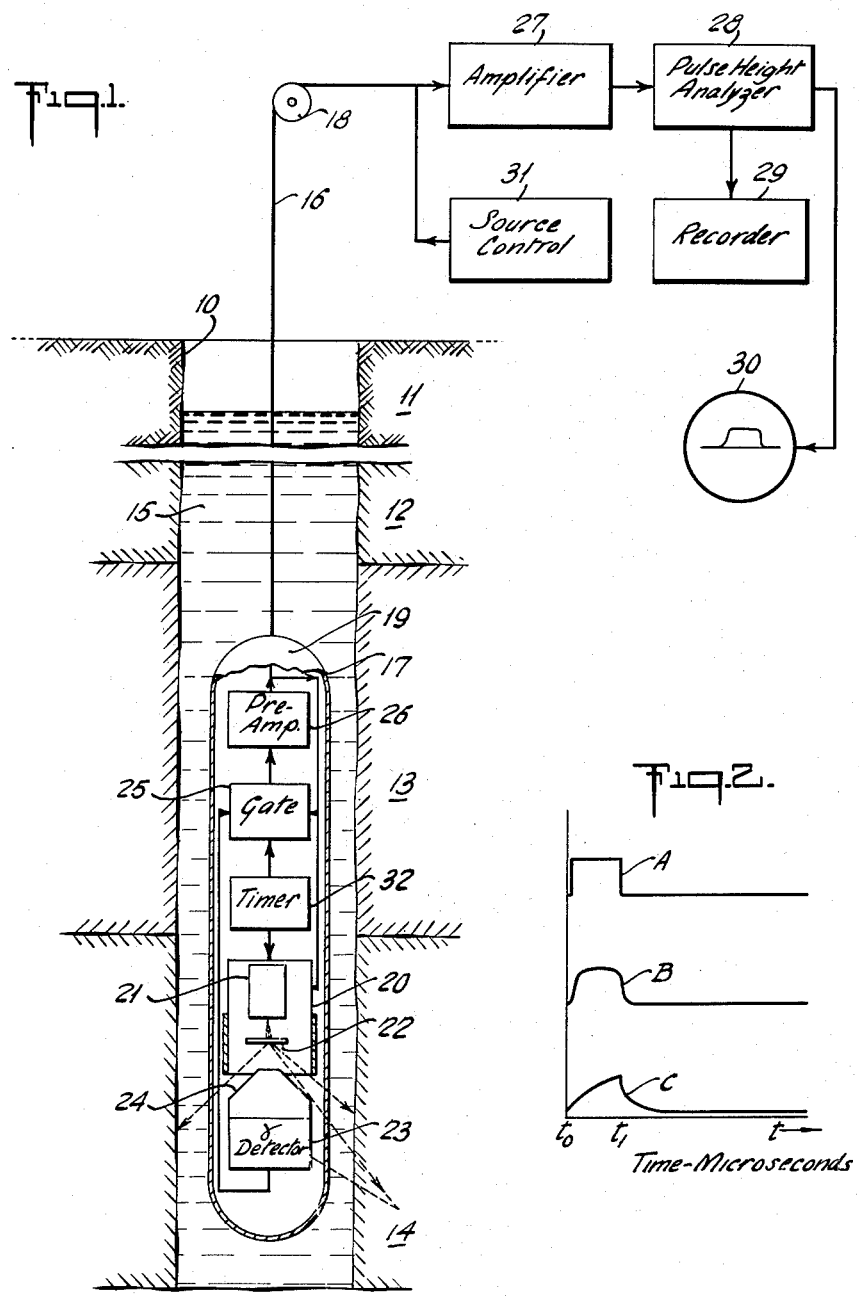

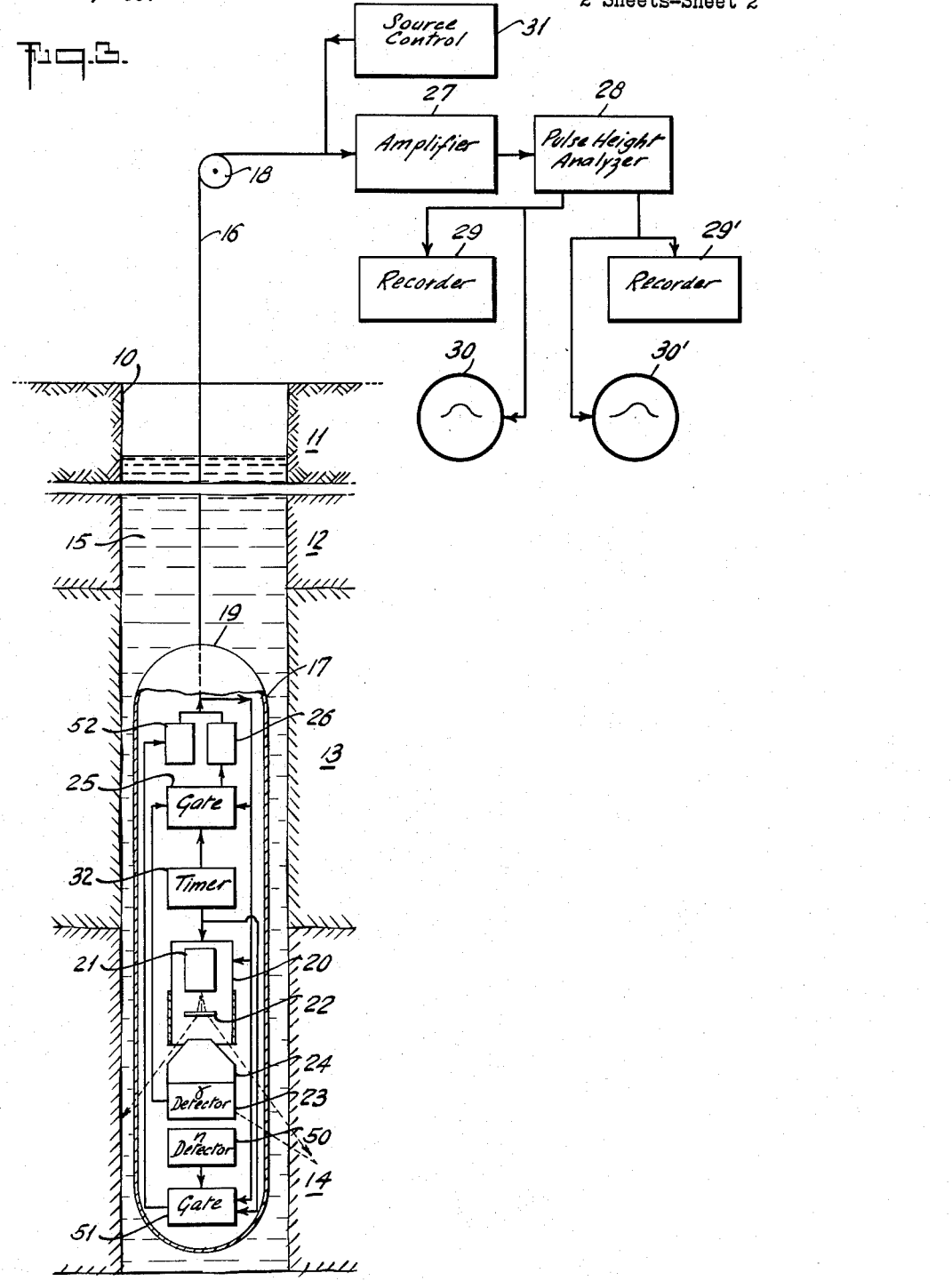

3,115,579
RADIOACTIVITY WELL LOGGING FOR CARBON DETERMINATION
Hugh E. Hall, Jr., and Alexander S. McKay, Bellaire, Tex., assignors to Texaco Inc., a corporation of Delaware
Filed Jan. 7, 1957, Ser. No. 632,846
20 Claims. (Cl. 250—83.3)

The present invention relates generally to the determination of the nature of earth formations; and, more particularly, it is concerned with the analysis of earth formations along the traverse of a bore hole through the irradiation of the formations with neutrons in order to produce certain observable effects that are detected as an indication of the nature of the formations.

Accordingly, it is a general object of the present invention to provide improvements in radioactivity well-logging wherein a source of neutrons is employed to produce an observable effect indicative of the nature of the formation.

It is well known to analyze earth formations in situ along the traverse of a bore hole through the use of various radioactivity analysis techniques. For example, it is possible to determine the presence of porous zones along the path of the bore hole through the use of techniques that may indicate the presence or absence in the pores of the formation of hydrogen, which may be present in hydrocarbon oil or water. Such analysis may be carried on through the use of neutron-neutron or neutron-gamma logs in accordance with known techniques. Further, in accordance with the prior art, it has been proposed to determine whether or not salt-water is present in the formations along the traverse of an earth bore by analyzing for the presence of chlorine as a constituent thereof. This may be accomplished as set forth in United States Patent No. 2,752,504, issued June 26, 1956, in the name of Alexander S. McKay and reissued on October 29, 1957 as Re. 24,383. In accordance with the referenced patent, a formation to be analyzed is bombarded with neutrons and neutron-capture gamma rays having a characteristic energy level are detected as an indication of the presence of chlorine in the formation.

While the aforementioned prior-art techniques for analyzing earth formations in situ provide valuable information; nevertheless, it is often desirable to obtain other information as to the nature of the formations. It is very desirable in the oil well industry, for example, to determine the presence of carbon in earth formations.

Accordingly, it is another object of the present invention to provide improvements in radioactivity well-logging techniques suitable for the analysis of the earth formations traversed by a bore hole in order to determine the presence therein of carbon.

It is a more specific object to employ such techniques for the quantitative determination of the carbon content of earth formations.

By analyzing a formation for hydrogen and carbon an indication may be obtained as to the presence, or absence, of hydrocarbon oil.

Thus, it is still another object of the present invention to provide improvements in radioactivity analysis suitable for determining the presence of hydrocarbon oils in the earth formation along the traverse of a bore hole.

A further object of the invention is to provide for the in situ detection and quantitative determination of certain material in an earth formation.

It is still another object of the present invention to provide improved well-logging apparatus suitable for logging a bore hole for the presence therein of carbon.

Briefly stated, in accordance with one aspect of the present invention, earth formations along the traverse of a bore hole are irradiated with fast neutrons having an energy range in excess of a predetermined value and gamma rays having a characteristic energy value produced by said irradiation through inelastic collision are detected as an indication of the presence in the formations of a suspected material capable of emitting gamma rays of the characteristic energy value. A preferred mode of carrying out the invention involves operation of the neutron source for a comparatively brief duration while concurrently detecting neutron-gamma rays of characteristic energy level as an indication of the presence of the suspected material. A further aspect of the invention contemplates the determination of the rate of occurrence of the detected gamma rays in order to provide a quantitative determination of the detected material.

A specific aspect of the invention is concerned with irradiation of earth formations traversing a bore hole with fast neutrons in excess of a predetermined value and detecting gamma rays of the order of 4.43 million electron volts as an indication of the presence of carbon.

A further aspect of the invention contemplates a method of analyzing an earth formation adjacent a bore hole for the presence of hydrocarbon oil involving radioactivity analysis for the presence of hydrogen together with radioactivity analysis for the presence of carbon, as herein set forth.

For additional objects and advantages, and for a better understanding of the invention, attention is now directed to the following detailed description and accompanying drawing. The features of the invention which are believed to be novel are particularly pointed out in the appended claims.

In the drawing:

FIGURE 1, illustrates a side-elevational view, partly in cross-section, showing a well-logging instrument positioned in a bore hole through a series of earth formations.

FIGURE 2, is a graphic representation of the form of neutron pulse employed to irradiate the earth formations, together with certain responses produced in the formation by such a pulse; and, FIGURE 3, is a side-elevational view, partly in cross-section, showing a well logging instrument similar to that of FIGURE 1 embodying further features of the invention.

Referring particularly to FIGURE 1 of the drawing, there is shown a bore hole 10 traversing a plurality of earth formations 11, 12, 13, and 14 and containing a fluid content 15 which may comprise the usual drilling fluid, water, or crude oil, for example. Suspended within the bore hole 10, as by means of a cable 16, there is shown a well-logging instrument 17 constructed in accordance with the principles of the invention. The cable 16 may include one or a plurality of electrical conductors (not individually shown) in order to afford means for transmitting electrical signals between the instrument 17 and electrical apparatus at the surface of the earth. The details of the surface apparatus will be discussed in greater detail below. A measuring apparatus 18, represented diagrammatically, is shown at the surface of the earth in contact with the cable 16 and provides means for determining the length of the cable 16 suspended in the bore hole 10 during the course of a logging operation.

The logging instrument 17 comprises an outer shell or casing 19 formed in accordance with known techniques to withstand the pressures and temperatures commonly encountered in the well-logging art. Within the casing 19 there is provided a neutron source 20 capable of producing controlled bursts or pulses of neutrons. Preferably, the source 20 may comprise a positive ion accelerator represented diagrammatically at 21, together with an appropriate target 22 capable of producing neutrons having a desired energy level when bombarded with positive ions. By way of example, the source 20 may comprise apparatus involving the acceleration of deuterons against a target containing deuterium or tritium in order to produce neutrons in accordance with known physical principles.

Within the housing 19, spaced from the source 20 along the vertical axis of the instrument 17, there is provided a gamma-ray detector 23 which may be positioned below the source 20, as shown. Intermediate the two devices 20, 23 there is provided a shield 24 for preventing undesired radiation produced by the source 20 from reaching the detector 23. The shield 24 may comprise lead of adequate thickness to prevent gamma-rays that may originate in the target 22 from reaching the detector 23 and may further include appropriate material for thermalizing and capturing neutrons that would otherwise reach the detector 23, especially when the latter device may be of a type that is activated thereby. The detector 23 may comprise a known type of apparatus suitable for the selective detection of gamma rays in a predetermined energy range as hereinafter discussed. For example, the detector 23 may comprise an organic luminophor of adequate size to produce scintillations, the intensity of which corresponds to the energy of the detected gamma rays, together with an appropriate photo-electric device, such as a photomultiplier, for conversion of the light impulses to electrical energy. The output of the detector 23 is coupled through a gating means 25 to a preamplifier 26. The gate 25 may comprise switching means for selectively transmitting the detector output to the preamplifier 25 in accordance with a desired schedule. The preamplifier 26 provides means for enhancing the detector output signal for transmission over the cable 16 to a linear amplifier 27 located at the surface of the earth. The output of the amplifier 27 is, in turn, coupled to a pulse-height analyzer 28 whose function is to segregate electrical pulses corresponding to one or more predetermined energy ranges of the detected gamma rays. The output of the pulse-height analyzer 28 is, in turn, coupled to a recorder 29 which may be a magnetic tape recorder or a graphic type recorder, for example, for providing a permanent record of a desired gamma ray signal for correlation with the position of the detector 23 in the well bore 10. An additional display device, such as an oscilliscope 30, is shown coupled to the output of the pulse-height analyzer 28 in order to provide a visual display of the detected signal. It is to be understood that the pulse-height analyzer 28 may include a rate-meter circuit in order to provide a continuous signal indicative of the average rate-of-occurrence of detected gamma rays of a given energy range. Preferably, the analyzer 28 is of the multi-channel type, in which case each channel may include appropriate ratemeter, display and recording means.

At the surface of the earth there is also provided a source control 31 that is coupled by means of the cable 16 to the source 20 in order to provide means for controlling the operation thereof while in the bore hole 10. The source control 30 is also coupled to the gate 25 in order that the source 20 and the detector 23 may be turned on and off simultaneously from the surface of the earth as desired.

Preferably, a timer 32 is also provided in the instrument 17 coupled to the source 20 and the gate 25. The timer 32 may comprise electro-mechanical or electrical apparatus suitable for controlling the operation of the source 20 and the output of the detector 23 in accordance with a desired schedule of intermittent operation. For example, the time 32 may be adapted and arranged to switch the source 20 on for successive pulses of short duration, say of the order of one microsecond, and simultaneously to open the gate 25 in order that the output of the detector 23 may be transmitted to the surface only during the intervals that the source 20 is operating.

Although the pulse-height analyzer 28 is shown located at the surface of the earth, it may preferably be located in the logging instrument 12. By thus locating the analyzer 28 within the logging instrument 12, it is possible to simplify the transmission of signals over the cable 16 from the logging instrument in the bore hole to the surface equipment, since the output signal from the pulse-height analyzer 28 may be more readily transmitted over the cable than the closely spaced pulses that comprise the input signal to the analyzer 28.

An apparatus such as that described above may be employed to conduct a neutron inelastic collision log of one or more earth formations, such as the formations 11, 12, 13 and 14 illustrated in the drawing, in order to analyze the same for the presence therein of a given element. Such a log may be made by passing the instrument 17 through the bore hole 10 past the formations while operating the source 20 in such manner as to irradiate the formations 11, 12, 13 and 14 with neutrons of predetermined minimum energy level, somewhat higher than the first energy level state of the nucleus of the selected element. Depending upon the presence of nuclei of the selected element, there will be produced in the formation inelastic gamma rays of predetermined energy level, equivalent to that of the first energy level state of the selected nucleus. Some of the gamma rays thus produced travel from the formation to the detector 23 resulting in the production of an electric pulse whose amplitude corresponds to the energy of the gamma ray that originated it. Pulses of a given amplitude may be selectively observed through the operation of the pulse-height analyzer 28. By observing the detected signal of the desired energy level in correlation with the position of the instrument 17 in the bore hole, there is produced an indication of the presence and precise location in the formations of the selected elements. By use of the ratemeter, the number of detected gamma rays of given energy may be counted per unit of time as an indication of the concentration of the element in the formation.

In order to reduce background interference from high energy capture gamma rays that may otherwise be produced in the formation due to thermalization and capture of fast neutrons, the inelastic collision log should be carried on by operating the source 20 in a series of comparatively short bursts or pulses of neutrons, which may preferably be of the order of one microsecond in duration, and by operating the detector only during the time that the source is on. Although a source duration of 1 microsecond is preferred, it may be longer, up to about 5.0 microseconds assuming a formation porosity of about 30 percent. During this comparatively short interval only a comparatively few neutrons are likely to be thermalized and captured to result in high energy capture-gamma rays which might otherwise tend to interfere with the detected signal. The interval between successive neutron pulses should be sufficiently long to avoid building-up of induced gamma rays that might also tend to mask those produced by the inelastic collision reaction. Accordingly, the interval between pulses should preferably be of the order of a few milliseconds. Since the inelastically produced gamma rays are detected while the fast neutron source is operating, the interval between neutron bursts should be of sufficient duration to permit most of the neutrons from each burst to be thermalized and captured before the next burst occurs, in order to eliminate neutron-capture gamma rays from the detected signal.

The neutron inelastic collision reaction by which inelasticity produced gamma rays are produced is based upon the concept that the nucleus of a given atom has a plurality of definite energy states from a predetermined lower one on upward. When a neutron of predetermined minimum energy level, slightly in excess of the lowest state of the nucleus, enters the nucleus of a selected element, it transfers thereto sufficient energy to excite it to its first excited state. The neutron then leaves the nucleus with an energy that is less than that with which it entered, the amount being equal to that transferred to the nucleus. The excited nucleus decays to the ground state by the emission of a gamma ray of predetermined characteristic energy which is equivalent to that of the first excited state energy. It is emphasized that a neutron below a definite energy cannot excite the nucleus with an inelastic collision. Only neutrons of higher energy are able to produce this effect.

The inelastic collision reaction by which carbon is able to produce characteristic gamma rays may be symbolized as $C^{12}(n,n')C^{12*}$. This reaction has a neutron excitation threshold of 4.80 million electron volts and produces decay gamma rays of 4.43 million electron volts. Thus, the selective detection of carbon may be accomplished through irradiation of the formation with fast neutrons having a characteristic energy of the order of 5.0 mev., or higher, and by the selective detection of gamma rays having an energy value of the order of 4.43 mev.

The inelastic collision reaction involving neutrons having energies of 5.0 mev. depends substantially on the presence of carbon in the formations and thus provides a good indication of the presence of carbon when pulses corresponding to 4.43 mev. gamma rays are measured. It is quite unlikely that a gamma ray as high as 4.43 mev. will be produced by elements other than carbon in response to neutrons of the order of 5.0 mev. Although neutrons of higher energy than 5.0 mev. may be employed to produce inelastic-collision gamma rays from carbon, it is preferred that the neutrons be in the range from 5.0 to 6.5 mev. By thus limiting the upper energy level of the neutron beam, certain interference that may otherwise be produced by neutrons of energy higher than 6.5 mev. may be avoided.

Apparatus for carrying out the invention may advantageously produce neutrons through the $Be^9(\alpha,n)C^{12}$ reaction, in order to provide neutrons of approximately 6.5 mev. with an alpha-ray bombarding energy of .6 mev. This reaction affords the advantage of providing the desired neutron beam without requiring an unreasonably high accelerator voltage in the logging instrument.

In general, it may be stated that the cross-section, i.e., the likelihood of a reaction taking place, is less for the higher excited states above the first. Moreover, the excited states for the heavier elements are relatively close together. In order that an element provide substantial interference to the analysis for carbon, it would have to be either a light element or a magic number element. It is not likely that interference should be encountered from such a cause during the course of a bore hole log for the presence of carbon.

Certain advantages are afforded by the inelastic collision log for the presence of carbon along the traverse of an earth bore. For example, the counting-rate of detected gamma rays of the selected energy value registers substantially only a rate that is proportioned to the number of carbon nuclei present in the region under observation. Therefore, the log is an effective quantitative analysis for carbon as well as being a qualitative analysis. Moreover, such a log observes carbon with a reasonable cross-section, thus insuring a reasonably accurate quantitative determination over a comparatively wide range of carbon percentages, including relatively small percentages thereof.

Apparatus for carrying out such a log in accordance with the invention may comprise an accelerator beam that is very directional in order to concentrate neutrons of the desired energy in the formation. This is of interest inasmuch as the neutron energy decreases with increasing angle from the particle beam.

It is contemplated in accordance with the invention to provide for the in situ analysis of earth formation for hydrocarbon content by correlation of a carbon log, as herein set forth, with a hydrogen log of the earth formation under analysis.

In accordance with a further specific aspect of the invention, there is provided a simultaneous hydrogen-carbon log of one or more earth formations traversed by a bore hole. In accordance with one embodiment of this aspect of the invention, such a log may be performed by conducting a combination log involving detection of carbon through the inelastic collision principle as herein set forth, and the detection of hydrogen by determination of the rate at which the material of the formation slows down fast neutrons. Advantageously, in accordance with the invention, this combination log is accomplished by means of a single pulsed neutron source, together with appropriate radiation detection apparatus.

A hydrogen content log obtained through measurement of the slowing down rate of fast neutrons may be performed as set forth in copending application, Serial No. 546,736, filed in the name of Fontaine C. Armistead. Such a log is based on the principle that fast neutrons permeating a medium are slowed down to the thermal range at a rate characteristic of the constituents of the medium. The characteristic slowing down time, symbolized as $T_s$, for fast neutrons in a medium is governed primarily by the presence of light chemical elements and is, in fact, determined substantially altogether by the concentration of hydrogen in earth formations. Such a hydrogen log may be made through irradiation of the formations with fast neutrons from a source characterized by an abrupt change in source rate, followed by the detection of radiation emanating from the formation as an indication of the rate at which fast neutrons in the medium are slowed down to the thermal range. The neutron slowing down time $T_s$ of water or oil in typical earth formations, assuming about 30 percent porosity due substantially entirely to the hydrogen content thereof, is of the order of about 5.0 microseconds. Thus, when the source of neutrons is first turned on to produce a pulse of neutrons, it is seen that the medium of interest, in this case an earth formation, is permeated with fast neutrons at a rate determined by the strength of the irradiating source. In time, as determined by the characteristic slowing down time $T_s$ of the medium, the fast neutrons are slowed down to the thermal range due to interactions in the medium. There is thus produced in the medium a thermal neutron population whose growth rate is determined by the slowing down time $T_s$ of the medium. If the irradiating fast neutron pulse or burst is of substantially rectangular wave-form, thus having a substantially zero time-rise to the average maximum or plateau value, a plot of the build-up of the thermal neutron population in the medium is a faithful representation of the rate at which the fast neutrons are slowed down by the medium. The characteristic build-up of the thermal neutron population, therefore, provides means for determining the characteristic slowing down time $T_s$ of the medium. In the case where hydrogen is present in the formation in significant quantity, the epithermal and thermal neutron population of the medium will begin to be present in significant quantities after the source has been on for the slowing down time $T_s$ of oil or water, namely about 5.0 microseconds, and will continue to rise to an equilibrium value until the rate of loss of thermal neutrons in the medium equals the rate of production of thermal neutrons by the slowing down of fast neutrons from the source. The loss of thermal neutrons is accounted for by their capture in the formation due to the presence of strongly capturing elements. The time that the thermal neutrons remain in the formation, termed the lifetime against capture, or $T_c$, is distinct, from the characteristic slowing down time $T_s$, but is also characteristic of the element(s) responsible for the capture.

Since thermal neutrons due to the hydrogen nuclei of oil or water have a very short slowing down time $T_s$, as compared with the other elements ordinarily present in earth formations, thermal neutrons produced by the slowing-down effect of hydrogen may thus be distinguished from others by determining the thermal or epithermal neutron population in the formation before the effect of the other elements becomes significant.

A preferred mode of carrying out a combination hydrogen-carbon log in accordance with the invention is concerned with irradiating the formation to be analyzed with a pulse or burst of fast neutrons having an energy level of the order of 5 mev. for a comparatively brief time interval while concurrently detecting gamma-rays having an energy range of 4.43 mev. in order to determine the carbon content of the formation as discussed above. During a predetermined time interval after the source is pulsed, epi-thermal neutrons emanating from the formation are detected in order to determine the characteristic slowing down time $T_s$ of the formation. The time between the initiation of the neutron pulse and the beginning of the predetermined time interval may appropriately correspond to the slowing down time $T_s$ of oil or water; viz., about 5.0 microseconds as indicated above. The detection inerval should terminate before the capture effect of other elements in the formation becomes significant.

Referring now to FIGURE 2, there is shown a graphic display of a substantially rectangular wave-form neutron pulse A having an average maximum energy level in excess of 5 mev. and a predetermined time duration $T_1$ of one (1) microsecond. Plotted against the same time base T, there is shown a graphic representation of a typical inelastically-produced 4.43 mev. gamma-ray response B produced during the time $T_1$ by interaction of the neutron pulse A with carbon nuclei in an earth formation. Along the same time base T, there is also shown a graphic representation of the build-up and decay of the thermal neutron population C in the formation due to the presence of hydrogen in the form of oil or water. It is noted that this curve C begins to rise sharply toward its maximum value in a time $T_s$ of about 5.0 microseconds after the source pulse A is initiated and decays after the source stops at a different rate, as determined by the characteristic thermal neutron capture time $T_c$ of the formation.

In FIGURE 3, there is shown apparatus for conducting a combination hydrogen-carbon log in accordance with the invention. This apparatus is similar to that of FIGURE 1 with the further addition of an epithermal neutron detector 50, located at a predetermined distance from the source 20, shown below the gamma-ray detector 23, and having associated therewith a gate 51 and pre-amplifier 52, as well as means for conveying additional information provided by the neutron detector 50 through the cable 16 to the surface. By way of example, the additional information provided by the neutron detector 50 may be transmitted through an additional conductor in the cable 16, or preferably, over the same conductor as the information from gamma-ray detector 23. In the latter case, the respective signals from the two detectors may be transmitted to the surface at different amplitude levels where they are separated by pulse-height discrimination. The neutron detector 50 may, for example, be a boron sensitized counter such as a boron-loaded scintillometer, having a layer of cadmium surrounding it. It is to be understood that the epithermal neutron detector should be sufficiently fast to detect a significant amount of radiation during the detection interval. The apparatus provided at the surface is generally like that of FIGURE 1, but there is further provided appropriate display means, shown as a recorder 29′ and oscilloscope 30′, for making use of the information provided by the neutron detector 50. The apparatus of FIGURE 3 may be employed to conduct the desired hydrogen-carbon log as herein set forth by operating the source to produce a desired pulse or burst of neutrons of predetermined duration, under the control of the source control 31 at the surface or by means of the time 32 within the instrument 17 itself.

The concurrent detection of gamma rays by means of detector 23 is accomplished in substantially the same manner as in the case of the apparatus of FIGURE 1. The detection of epithermal neutrons by means of the detector 50 may be accomplished in similar manner to the detection of gamma rays by means of detector 23, except that the time of effective neutron detection, as determined by the gate 51, may be varied in relation to the operating time of the source 20 in accordance with the characteristic slowing down time $T_s$ of the detected material. Thus, while in certain instances it may be desirable simultaneously to detect epithermal neutrons during the operation of the source and gamma-ray detector 23, it may be otherwise desirable to operate the thermal neutron detector for a brief time interval immediately following the neutron burst from the source 20 in order to eliminate detection of thermal neutrons that may be produced by the source 20 during its operation. In the latter case, it is desirable that the neutron detector 50 be gated into effective operation for a comparatively brief time interval immediately following the neutron burst in order that the epithermal neutrons detected thereby will be substantially only those due to the slowing of fast neutrons by hydrogen in the formation.

As in the case of the apparatus of FIGURE 1, the pulse-height analyzer 28 may be located in the instrument 17, rather than at the surface of the earth as shown.

In accordance with still another embodiment of the invention for determining both the hydrogen and carbon contents of a formation, it is contemplated to conduct a combination log involving detection of carbon through the inelastic collision principle as herein set forth together with the detection of hydrogen by directing fast neutrons into the formation and determining the attenuation of the fast neutron population due to the presence of hydrogen. This aspect of the invention may be carried out with apparatus generally like that shown in FIGURE 3. Accordingly, FIGURE 3 serves to illustrate this aspect of the invention, bearing in mind that a detector of fast neutrons is employed rather than an epithermal neutron detector. More particularly, apparatus in accordance with this aspect of the invention includes means for determining the carbon content of a formation as shown in FIGURES 1, and 3, and may be operated to achieve this purpose as described above. Instead of the epithermal neutron detector of FIGURE 3, however, apparatus for performing this method of analysis includes a fast neutron detector vertically spaced from the neutron source and which may be advantageously located below the gamma ray detector, as in the case of the epithermal neutron detector of FIGURE 3. The fast neutron detector is coupled through a gate, as in the case of the epithermal neutron detector of FIGURE 3, to a pre-amplifier located within the instrument, as in the FIGURE 3 apparatus, and which provides means for enhancing the detector output for transmission of the signal to the surface of the earth. The fast neutron detector may comprise a scintillation-type detector that is sensitive to neutrons of the energy range emitted by the source.

The hydrogen content of the formation may be determined by means of the fast neutron source and detector by measuring the effect the formation has in slowing down neutrons from the source. Such a log is possible since fast neutrons emitted by the source and which travel toward the fast neutron detector are slowed through collision with intervening elements. The slowing down effect is due almost entirely to the lighter elements, of which hydrogen is the most effective and most predominant in earth formations. In carrying out the log, the fast neutron flux arriving at the fast neutron detector from the source is measured. The detected measurement provides an inverse indication of the hydrogen content of the intervening formations. As the hydrogen content of the formation increases, its effectiveness in preventing fast neutrons from reaching the fast neutron detector is more pronounced with a resultant decrease in the fast neutron flux measured at the fast neutron detector.

Inasmuch as the fast neutron source is pulsed in accordance with the requirements of the inelastic collision log for carbon, the measured fast neutron flux will likewise be in pulsed form. As indicated above, the amplitude of the detected pulses of fast neutrons is inverse to the hydrogen content of the formation.

The apparatus of FIGURE 3 as modified by substitution of a fast neutron detector for the epithermal neutron detector provides means for gating the detected fast neutron signal into operation only when the source is operating. By thus operating the fast neutron detector only when the fast neutron source is operating the effect of neutron capture gamma rays upon the detected signal may be eliminated. The neutron capture gamma rays are produced through thermalization and capture of the fast neutrons from the source and do not begin to be present in the formation and well fluid in significant quantities until sufficient time has elapsed after initiation of the fast neutron pulse to allow a significant quantity of the fast neutrons to be thermalized and captured by the constituents of the well fluid or formation. Advantageously, therefore, the duration of the fast neutron pulse should be less than the characteristic neutron slowing down and capture times of the well fluid and formation, whichever is shorter. Moreover, the interval between successive fast neutron pulses should preferably be sufficiently long to permit thermalization and capture of substantially all of the neutrons thermalized and captured in the well fluid and formations.

The effect of neutron capture gamma rays upon the detection of fast neutrons from the source may be minimized through the use of appropriate gamma ray shielding material, such as lead, which is of sufficient thickness to shield most of the interfering gamma rays from the detector, but which is sufficiently permeable to fast neutrons to permit detection and measurement of the desired signal. Provided that appropriate shielding is provided together with biasing to discriminate against undesired signals, the fast neutron detector may be operated continuously in certain instances rather than in a gated manner as described above.

Due to the difficulty of shielding neutron capture gamma rays from the detected signal, the limitation of the source duration together with the provision of a period of source inactivity between successive neutron pulses is of more importance in the case of the inelastically produced gamma log than in the case of the fast neutron log for the presence of hydrogen. In the case of inelastically produced gamma ray log, the characteristic slowing down and capture times of the formation and well fluid also determines the maximum duration of the source pulse and the minimum duration of the intervals between successive pulses.

By limitation of the duration of the individual neutron bursts from the source and by spacing the successive pulses sufficiently far apart in time, the likelihood of producing radioactive isotopes in the formation or well fluid and which may become sources of interfering gamma radiation is also minimized.

Obviously, many modifications and variations of the invention as hereinbefore set forth may be made without departing from the spirit and scope thereof, therefore only such limitations should be imposed as are indicated in the appended claims.

We claim:

1. The method of analyzing an earth formation along the traverse of a bore hole for the presence of carbon by means of an instrument that is adapted and arranged to be passed through the bore hole and that is suitable to produce fast neutrons in excess of a predetermined energy level and to detect gamma rays of corresponding predetermined energy level, which comprises irradiating the formation along the path of the bore hole with neutrons having an energy range in excess of 4.80 million electron volts as determined by the inelastic reaction threshold characteristic of carbon and which range has an upper limit of 6.5 million electron volts, and selectively detecting inelastically produced gamma rays of the order of 4.43 million electron volts produced in the formation by said neutrons as an indication of the presence of carbon nuclei in the formation.

2. The method of analyzing an earth formation along the traverse of a bore hole for the presence of carbon by means of an instrument that is adapted and arranged to be passed through the bore hole and that is suitable to produce fast neutrons of a given energy range in excess of a predetermined minimum energy level and to detect gamma rays of corresponding predetermined energy level, which comprises irradiating the formation along the path of the bore hole with neutrons having an energy range of 5.0 to an upper limit of 6.5 million electron volts, and selectively detecting inelastically produced gamma rays of 4.43 million electron volts produced in the formation by said neutrons as an indication of the presence of carbon in the formation.

3. The method of analyzing an earth formation along the traverse of a bore hole by means of an instrument that is adapted and arranged to be passed through the bore hole and that is suitable to produce a controlled burst of fast neutrons in excess of a predetermined minimum energy level and to detect gamma rays of corresponding predetermined energy level, which comprises irradiating the formation along the path of the bore hole with a burst of neutrons having an energy range in excess of a predetermined value of at least 4.8 million electron volts as determined by the inelastic reaction threshold characteristic of a selected nuclei and which range has an upper limit of 6.5 million electron volts, detecting inelastically produced gamma rays of predetermined energy level produced in the formation by said neutrons as an indication of the presence of said nuclei in the formation substantially only during said neutron burst, and maintaining the detecting means inoperative following the neutron burst for at least a sufficient time interval to avoid detection of radiation other than said inelastically produced gamma rays resulting from said neutron burst.

4. The method of analyzing an earth formation along the traverse of a bore hole by means of an instrument that is adapted and arranged to be passed through the bore hole and that is suitable to produce a controlled burst of fast neutrons in excess of a predetermined minimum energy level, said instrument being adapted and arranged to detect gamma rays of corresponding predetermined energy level and to detect epithermal neutrons, which comprises irradiating the formation along the path of the bore hole with a burst of neutrons having an energy range in excess of a predetermined value of at least 4.8 million electron volts as determined by the inelastic reaction threshold characteristic of a selected nuclei and which range has an upper limit of 6.5 million electron volts, simultaneously selectively detecting inelastically produced gamma rays of predetermined energy level produced in the formation by said neutrons as an indication of the presence of said nuclei in the formation, and separately detecting epithermal neutrons during a predetermined time interval after the initiation of said burst, as an indication of the presence of certain other nuclei in the formation.

5. The method of analyzing an earth formation along the traverse of a bore hole by means of an instrument that is adapted and arranged to be passed through the bore hole and that is suitable to produce a controlled burst of fast neutrons in excess of a predetermined minimum energy level, said instrument being adapted and arranged to detect gamma rays of corresponding predetermined energy level and to detect fast neutrons, at a position spaced from the source along the formation which comprises irradiating the formation along the path of the bore hole with a burst of fast neutrons having an energy range in excess of 4.8 million electron volts as determined by the inelastic reaction threshold characteristic of carbon nuclei and which range has an upper limit of 6.5 million electron volts, simultaneously selectively detecting inelastically produced gamma rays of the order of 4.43 million electron volts produced in the formation by said neutrons and providing a first signal that is proportional to the rate of occurrence of the detected gamma rays as an indication of the presence of carbon nuclei in the formation, separately detecting fast neutrons transmitted through the formation from the source to the detector and providing a second signal that is proportional to the rate of occurrence of the detected fast neutrons as an indication of the presence of hydrogen nuclei in the formation, thereby to obtain a quantitative indication of the presence of hydrocarbon material in said formation.

6. The method of analyzing an earth formation along the traverse of a bore hole by means of an instrument that is adapted and arranged to be passed through the bore hole and that is suitable to produce a controlled burst of fast neutrons in excess of a predetermined minimum energy level, said instrument being adapted and arranged to detect gamma rays of corresponding predetermined energy level and to detect fast neutrons, at a location spaced from the source along the formation which comprises irradiating the formation along the path of the bore hole with a burst of fast neutrons having an energy range in excess of 4.8 million electron volts as determined by the inelastic reaction threshold characteristic of carbon nuclei and which range has an upper limit of 6.5 million electron volts, simultaneously selectively detecting inelastically produced gamma rays of the order of 4.43 million electron volts produced in the formation by said neutrons to provide a first signal that is proportional to the number of carbon nuclei in the formation, and separately detecting fast neutrons transmitted through the formation from the source to the detector to provide a second signal that is proportional to the number of hydrogen nuclei in the formation, and plotting said two signals in correlation with the position of the logging instrument in the bore hole, thereby to obtain a quantitative indication of the hydrocarbon content of said formation.

7. The method of analyzing an earth formation along the traverse of a bore hole to determine the hydrocarbon content in said formation which comprises the steps of passing an instrument through the bore hole that is suitable to produce a controlled burst of fast neutrons in excess of a predetermined minimum energy level and to detect gamma rays of corresponding predetermined energy level and to detect neutrons of predetermined energy range, irradiating the formation with neutrons having an energy range in excess of 4.8 million electron volts as determined by the inelastic reaction threshold characteristic of carbon and which range has an upper limit of 6.5 million electron volts, simultaneously selectively detecting inelastically produced gamma rays of the order of 4.3 million electron volts produced in the formation by said neutrons as an indication of the presence of carbon nuclei in the formation, separately determining the characteristic neutron slowing down time of said formation as an indication of the presence of hydrogen nuclei therein, said characteristic neutron slowing down time being determined by separately detecting neutrons of predetermined energy range during a predetermined time interval after the initiation of the fast neutron burst from the source.

8. The method of claim 6 further characterized in that the method of analysis is performed by means of recurrent bursts of fast neutrons whose duration is less than the characteristic minimum slowing down and capture times of the well fluid and earth formation and wherein the interval between the successive fast neutron bursts is sufficiently long to permit thermalization and capture of substantially all of the neutrons from the preceding bursts.

9. The method of analyzing an earth formation according to claim 1 which is further characterized by the running of a hydrogen log of the earth formation along the traverse of the bore hole and correlating the carbon and hydrogen logs to give the hydrocarbon content of said formation.

10. The method of analyzing an earth formation along the traverse of a bore hole by means of an instrument that is adapted and arranged to be passed through the bore hole and that is suitable to produce a controlled burst of fast neutrons in excess of a predetermined minimum energy level, said instrument being adapted and arranged to detect inelastically produced gamma rays of corresponding predetermined energy level, which comprises irradiating the formation along the path of the bore hole with successive bursts of fast neutrons of at least 4.8 million electron volts to produce inelastic gamma radiation upon collision with carbon and having an upper energy limit of 6.5 million electron volts whose duration is less than the characteristic minimum slowing down and capture times of the adjacent well fluid and earth formation and wherein the interval between the successive fast neutron bursts is sufficiently long to permit thermalization and capture of substantially all of the neutrons from the preceding bursts, detecting the inelastically produced gamma rays of said corresponding energy range substantially only during said neutron bursts, and recording the intensity of the detected gamma radiation in correlation with the position of the logging instrument.

11. The method of claim 10 wherein the successive neutron bursts have a maximum duration of the order of 5 microseconds.

12. The method of claim 11 wherein the interval between successive neutron bursts is a plurality of milliseconds in duration.

13. The method of analyzing an earth formation along the traverse of a bore hole by means of an instrument that is adapted and arranged to be passed through the bore hole and that is suitable to produce a controlled burst of fast neutrons in excess of a predetermined minimum energy level, said instrument being adapted and arranged to detect inelastically produced gamma rays of corresponding predetermined energy level which comprises irradiating the formation along the path of the bore hole with successive bursts of fast neutrons in excess of 4.8 million electron volts and not more than 6.5 million electron volts whose duration is less than the characteristic minimum slowing down and capture times of the adjacent well fluid and earth formation and wherein the interval between the successive fast neutron bursts is sufficiently long to permit thermalization and capture of substantially all of the neutrons from the preceding bursts, substantially only during said neutron bursts detecting the inelastically produced gamma rays of 4.43 million electron volts as determined by the inelastic reaction threshold of carbon, and recording the intensity of the detected gamma radiation in correlation with the position of the logging instrument in order to provide a log of the carbon content of the formation.

14. The method of claim 13 wherein the successive neutron bursts have a maximum duration of the order of 5 microseconds and the interval between successive neutron bursts is a plurality of milliseconds in duration.

15. The method of claim 14 wherein the successive neutron bursts have a duration of the order of one microsecond.

16. The method of analyzing an earth formation along the traverse of a bore hole by means of an instrument that is adapted and arranged to be passed through the bore hole and that is suitable to produce a controlled burst of fast neutrons in excess of a predetermined minimum energy level, said instrument being adapted and arranged to detect inelastically produced gamma rays of corresponding predetermined energy level which comprises irradiating the formation along the path of the bore hole with successive bursts of fast neutrons of at least 4.8 million electron volts to produce inelastic gamma radiation upon collision with carbon and having an upper energy limit of 6.5 million electron volts, the interval between the successive fast neutron bursts being sufficiently long to permit thermalization and capture of substantially all of the neutrons from the preceding bursts, selectively detecting the inelastically produced gamma rays of said corresponding energy range, providing a signal display proportional to the intensity of said detected inelastic gamma radiation, during the interval between the successive fast neutron bursts detecting other radiation emitted from the formation as the result of the preceding neutron burst, and providing a signal display proportional to said other detected radiation.

17. The method of analyzing an earth formation along the traverse of a bore hole by means of an instrument that is adapted and arranged to be passed through the bore hole and that is suitable to produce a controlled burst of fast neutrons in excess of a predetermined minimum energy level, said instrument being adapted and arranged to detect inelastically produced gamma rays of corresponding predetermined energy level which comprises irradiating the formation along the path of the bore hole with successive bursts of fast neutrons of at least 4.8 million electron volts to produce inelastic gamma radiation upon collision with carbon and having an upper energy limit of 6.5 million electron volts, the interval between the successive fast neutron bursts being sufficiently long to permit thermalization and capture of substantially all of the neutrons from the preceding bursts, detecting the inelastically produced gamma rays of said corresponding energy range substantially only during said neutron bursts and prior to the build-up of significant gamma radiation due to the thermalization and capture of neutrons in the vicinity of said instrument, and recording the intensity of the detected gamma radiation in correlation with the position of the logging instrument.

18. The method of analyzing an earth formation along the traverse of a bore hole which comprises irradiating the formation along the path of the bore hole with successive bursts of neutrons including fast neutrons in excess of a predetermined minimum energy level of at least 4.8 million electron volts to produce inelastic gamma radiation upon collision with carbon and having an upper energy limit of 6.5 million electron volts, the interval between the successive fast neutron bursts being sufficiently long to permit thermalization and capture of substantially all of the neutrons from the preceding bursts by the material of their environment, detecting both inelastically produced gamma rays and fast neutrons emitted from the formation as the result of said bursts, and individually recording both the intensity of the fast neutron radiation and the intensity of the gamma radiation detected substantially only during the neutron bursts and prior to the build-up of significant gamma radiation due to the thermalization and capture of neutrons by their environment, both said neutron and gamma radiations being recorded in correlation with the location in the bore hole at which the recorded radiation was detected.

19. The method of analyzing an earth formation along the traverse of a bore hole which comprises irradiating the formation along the path of the bore hole with successive bursts of neutrons including fast neutrons in excess of a predetermined minimum energy level, the interval between the successive fast neutron bursts being sufficiently long to permit thermalization and capture of substantially all of the neutrons from the preceding bursts by the material of their environment, detecting fast neutrons emitted from the formation as the result of said bursts, and recording the intensity of the fast neutron radiation detected substantially only during the neutron bursts and prior to the build-up of significant gamma radiation due to the thermalization and capture of neutrons by their environment, said neutron radiation being recorded in correlation with the location in the bore hole at which the recorded radiation was detected.

20. The method of analyzing an earth formation along the traverse of a bore hole by means of an instrument that is adapted and arranged to be passed through the bore hole and that is suitable to produce a controlled burst of fast neutrons in excess of a predetermined minimum energy level and having an upper energy level limit of 6.5 million electron volts, said instrument being adapted and arranged to detect inelastically produced gamma rays of corresponding predetermined energy level, which comprises irradiating the formation along the path of the bore hole with successive bursts of fast neutrons of at least 4.8 million electron volts to produce inelastic gamma radiation upon collision with carbon and having an upper energy limit of 6.5 million electron volts, the interval between the successive fast neutron bursts being sufficiently long to permit thermalization and capture of substantially all of the neutrons from the preceding bursts, detecting the inelastically produced gamma rays of said corresponding energy range, providing a signal display proportional to the intensity of said detected inelastic gamma radiation occurring substantially only during said neutron bursts and prior to the build-up of significant gamma radiation due to the thermalization and capture of neutrons in the vicinity of said instrument, during the interval between the successive fast neutron bursts detecting other radiation emitted from the formation as the result of the preceding neutron burst, and providing a signal display proportional to said other detected radiation.

References Cited in the file of this patent

UNITED STATES PATENTS

| | | |
|---|---|---|
| 2,712,081 | Fearon | June 28, 1955 |
| 2,721,944 | Ruble | Oct. 25, 1955 |
| 2,744,199 | Juterbock et al. | May 1, 1956 |
| 2,769,096 | Frey | Oct. 30, 1956 |
| 2,991,364 | Goodman | July 4, 1961 |

FOREIGN PATENTS

| | | |
|---|---|---|
| 724,441 | Great Britain | Feb. 23, 1955 |